(12) United States Patent
Onoe et al.

(10) Patent No.: US 6,236,494 B1
(45) Date of Patent: May 22, 2001

(54) WAVELENGTH CONVERTING DEVICE AND METHOD OF FABRICATING WAVELENGTH CONVERTING DEVICE

(75) Inventors: Atsushi Onoe; Kiyofumi Chikuma; Ayako Yoshida, all of Tsurugashima (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/271,913

(22) Filed: Mar. 18, 1999

(30) Foreign Application Priority Data

Mar. 20, 1998 (JP) .................................................. 10-072793

(51) Int. Cl.⁷ ..................................................... G02F 1/365
(52) U.S. Cl. ............................ 359/332; 385/122; 385/141
(58) Field of Search ...................................... 359/326, 328, 359/329, 330, 332; 385/122, 129–132, 141, 142

(56) References Cited

U.S. PATENT DOCUMENTS 5,581,396 * 12/1996 Kubota et al. ........................ 359/332
6,163,397 * 12/2000 Onoe et al. .......................... 359/332

FOREIGN PATENT DOCUMENTS 6-67235 * 3/1994 (JP) .

* cited by examiner

*Primary Examiner*—John D. Lee
(74) *Attorney, Agent, or Firm*—Young & Thompson

(57) ABSTRACT

A wavelength converting device for converting a wavelength of a light is provided. The wavelength control device including: a waveguide layer for guiding the light; a substrate having a lattice constant is different from a lattice constant of the waveguide layer; and a buffer layer which is disposed between the waveguide layer and the substrate and which has a lattice constant between the lattice constant of the waveguide layer and the lattice constant of the substrate.

16 Claims, 5 Drawing Sheets

11.4312 Å
8.0831 Å
10: SPINEL (110) PLANE 5.6896 Å
3.9692 Å
11: KNbO₃ (002) PLANE

WAVELENGTH CONVERTING DEVICE AND METHOD OF FABRICATING WAVELENGTH CONVERTING DEVICE

BACKGROUND OF THE INVENTION

1. Field of the Invention

The present invention relates generally to a wavelength converting device for obtaining, for example, a second order harmonic by converting the wavelength of a light beam such as a laser, and more specifically to a wavelength converting device having a substrate composed of spinel and a waveguide formed of a $KNbO_3$ layer and a method of fabricating the wavelength converting device.

2. Description of the Related Art

A wavelength converting device has a function of radiating a second order harmonic of a laser. This is preferably utilized for obtaining a laser having a shorter wavelength. A typical wavelength converting device has: a substrate composed of spinel (for example, $MgO.Al_2O_3$); a waveguide formed of a $KNbO_3$ layer, which is formed on the substrate by crystal growth; an electrode layer formed on the surface of the $KNbO_3$ layer; and a stripe-shaped $TiO_2$ layer which is used to shut the light therein and which is formed on the surface of the $KNbO_3$ layer. The $KNbO_3$ layer has characteristics that a nonlinear optical constant is large and that a light damage resistance is high. Therefore, this type of the wave converting device enables high efficient wavelength conversion and has a long life.

However, this type of wave converting device has a problem that deformation occurs in the $KNbO_3$ layer because the lattice constant of the $KNbO_3$ layer is mismatched with that of the spinel (namely, a multiple of the lattice constant of $KNbO_3$ layer is mismatched with that of the spinel). This causes a loss to propagation of a light.

SUMMARY OF THE INVENTION

An object of the present invention is to provide a wavelength converting device and a method of fabricating a wavelength converting device, which can reduce deformation in a waveguide layer and achieve an optimum wavelength conversion if the lattice constant of a substrate and the lattice constant of the waveguide layer are mismatched with each other.

According to one aspect of the present invention, a wavelength converting device including: a waveguide layer for guiding the light; a substrate having a lattice constant different from a lattice constant of the waveguide layer; and a buffer layer which is disposed between the waveguide layer and the substrate and which has a lattice constant between the lattice constant of the waveguide and the lattice constant of the substrate. Since the buffer layer is located between the substrate and the waveguide layer, a mismatch of the lattice constants between the substrate and the waveguide layer can be eased. Therefore, the influence of the mismatch of the lattice constants between the substrate and the waveguide layer on the waveguide layer can be reduced, thereby reducing the deformation in the waveguide layer.

In the case where the waveguide layer comprises $KNbO_3$, the substrate comprises spinel, the buffer layer may comprise $K_{(1-x)}Rb_xNbO_3$. In this case, it is preferably that the mixing rate of Rb in the $K_{(1-x)}Rb_xNbO_3$ in the buffer layer is gradually varied between a surface of the buffer layer touching the substrate 1 and a surface of the buffer layer touching the waveguide layer. Instead of $K_{(1-x)}Rb_xNbO_3$ layer, $K_{(1-x)}Cs_xNbO_3$ layer may be uses as a buffer layer.

The present invention provides a method of fabricating this wavelength converting device. The method including the processes of: preparing the substrate; forming the buffer layer on the substrate by inducing crystal growth; and forming the waveguide layer on the formed buffer layer by inducing crystal growth.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be described. In the description set forth hereinafter, the present invention is applied to a channel type wavelength converting device having a substrate composed of spinel (for example, $MgO.Al_2O_3$). The channel type wavelength converting device is a device for obtaining a second order harmonic by converting the wavelength of an incident laser light.

Figure 1:
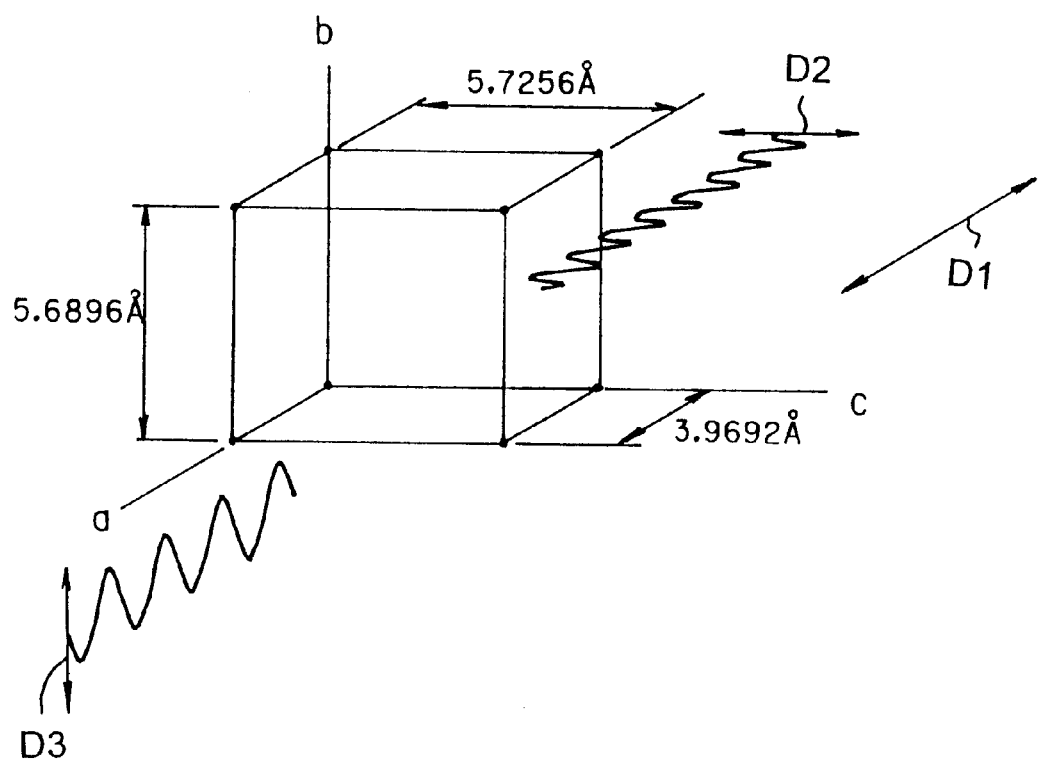
FIG. 1 shows a crystal structure of a KN layer, a fundamental wave and a second order harmonic of an embodiment of the present invention.

Referring first to FIG. 1, a $KNbO_3$ layer will be described. The $KNbO_3$ layer (It is referred to as a "KN layer", hereinafter.) is formed on the spinel substrate of the wavelength converting device. The KN layer serves as a waveguide layer for converting the wavelength of an incident laser light by using its optical nonlinear characteristics.

The KN layer is a ferroelectric substance having high resistance against a light damage, whereas it has a crystal structure of a rhombic or orthorhombic system and a rectangular parallelopiped lattice. As shown in FIG. 1, the lattice constants thereof are a=3.962 angstrom, b=5.6896 angstrom, and c=5.7256 angstrom.

A relationship between the polarization of rhombic system, the nonlinear susceptibility tensor, and the field is shown in an expression (1).

$$\begin{bmatrix} Pa \\ Pb \\ Pc \end{bmatrix} = \varepsilon_0 \begin{bmatrix} 0 & 0 & 0 & 0 & d_{15} & 0 \\ 0 & 0 & 0 & d_{24} & 0 & 0 \\ d_{31} & d_{32} & d_{33} & 0 & 0 & 0 \end{bmatrix} \begin{bmatrix} Ea^2 \\ Eb^2 \\ Ec^2 \\ 2\,Eb\,Ec \\ 2\,Ec\,Ea \\ 2\,Ea\,Ec \end{bmatrix} \quad (1)$$

where "P" denotes a polarization component, "d" denotes a second order nonlinear optical constant, "E" denotes a fundamental wave field component, "a", "b" and "c" denote axises in FIG. 1, respectively, and "$\varepsilon_0$" denotes the dielectric constant in vacuum.

In order to form the KN layer on the spinel substrate ($MgO.Al_2O_3$ substrate) by the epitaxial growth and use it as the waveguide of the wavelength converting device, the (002) plane, i.e., (a–b) plane in FIG. 1 of the KN layer is grown, and therefore the nonlinear optical constant $d_{32}$, which is the second largest constant among all the nonlinear optical constant, is used. In this case, as shown in FIG. 1, the second order harmonic that is transmitted in the direction of the a-axis (in the direction D1) and that vibrates in the a–c plane (in the direction D2) is obtained from the fundamental wave that is transmitted in the direction of the a-axis (in the direction D1) and that vibrates in the a–b plane (in the direction D3).

If it is assumed that the wavelength of the fundamental wave is 1.06 μm, the nonlinear optical constants of the KN layer is shown below.

$d_{33}$=−27.4±0.3 pm/V $d_{32}$=−18.3±0.3 pm/V $d_{32}$=−20.5±0.3 pm/V (λ=860 nm)

$d_{31}$=−15.8±0.3 pm/V $d_{24}$=17.1±0.4 pm/V $d_{16}$=16.5±0.4 pm/V $d_{15}$=16.5±0.4 pm/V

Figure 2:
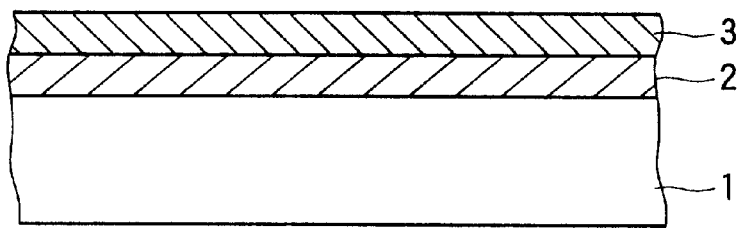
FIG. 2 is a sectional view of a part of a wavelength converting device of the embodiment of the present invention.
Figure 3:
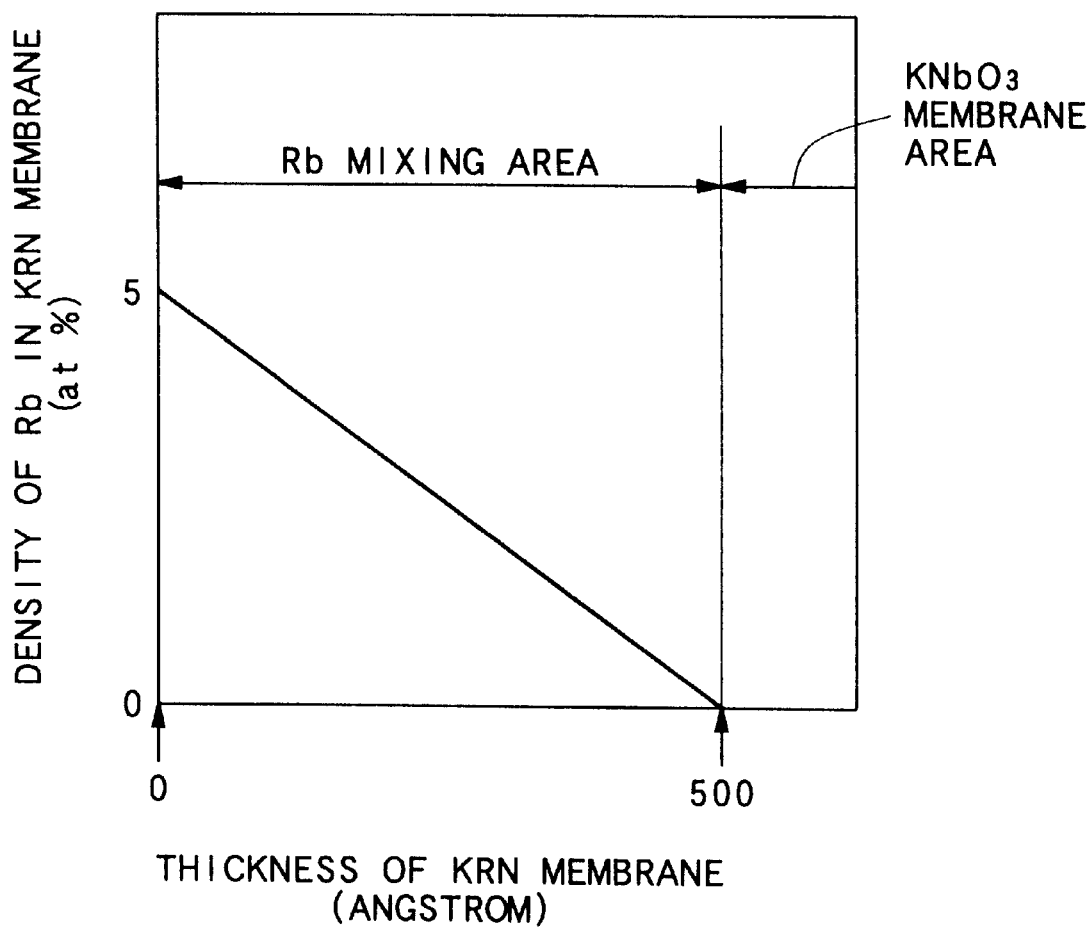
FIG. 3 shows a relationship between a thickness of a KRN layer and density of Rb in the KRN layer according to the embodiment of the present invention.

Referring to FIGS. 2 and 3, the configuration of the substrate and the KN layer of the wavelength converting device will be described.

In the wavelength converting device of the embodiment of the present invention, as shown in FIG. 2, a $K_{(1-x)}Rb_xNbO_3$ layer 2 (It is referred as a "KRN layer", hereinafter.) serving as a buffer layer and a KN layer 3 serving as a waveguide are formed on a substrate 1. The thickness of the KRN layer 2 is within the range of 300 to 500 angstrom, and particularly approximately 500 angstrom. The KN layer 3 is approximately 9000 angstrom in thickness. The KRN layer 2 is located between the substrate 1 and the KN layer 3. Both layers 2 and 3 are formed on the substrate 1 by inducing crystal growth by MOCVD (Metal Organic Chemical Vapor Deposition) method. The substrate 1 is composed of $MgO.AL_2O_3$(110).

As for the KRN layer 2, as shown in FIG. 3, the mixing ratio X of rubidium (Rb) in the KRN layer 2 is 5 atom % at the surface touching the substrate 1 and is 0 atom % at the surface touching the KN layer 3, and it gradually decreases between the surface touching the substrate 1 and the surface touching the KN layer 3 in the direction from substrate 1 to the KN layer 3.

Figure 4A:
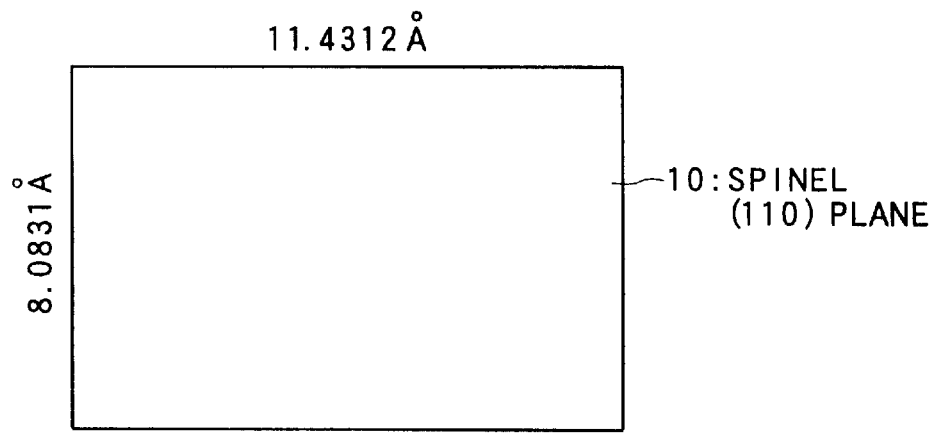
FIG. 4A shows a (110) plane of spinel of the substrate of the wavelength converting device.
Figure 4B:
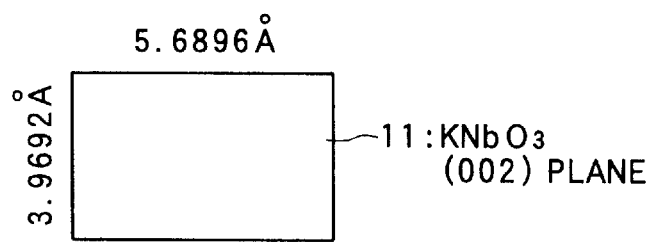
FIG. 4B shows a (002) plane of $KNbO_3$ of the KN layer of the wavelength converting device.
Figure 4C:
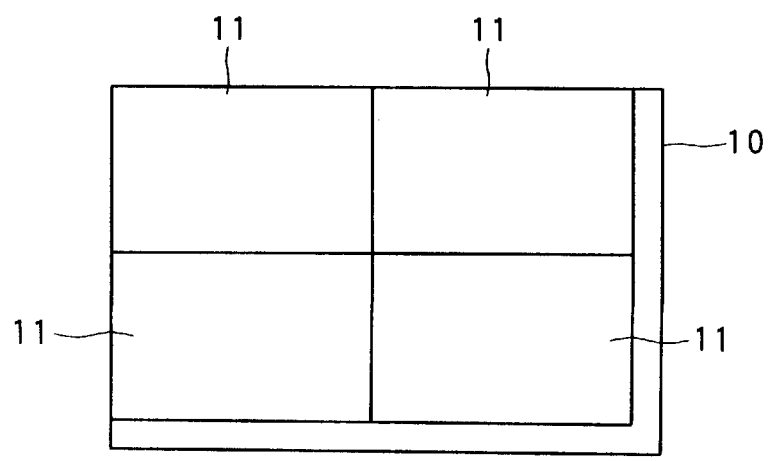
FIG. 4C shows a mismatch between the (002) plane of the KN layer and the (110) plane of the substrate.

FIG. 4A shows the (110) plane of the substrate 1. FIG. 4B shows the (002) plane of the KN layer 3. As shown in FIGS. 4A and 4B, the lattice constants of the (002) plane of the KN layer 3 are different from the lattice constants of the (110) plane of the substrate 1. As shown in FIG. 4C, if it is assumed that the KN layer 3 are directly formed on the substrate 1, the lattice constants of the KN layer 3 are mismatched with those of the substrate 1 (In FIG. 4C, four crystals 11 of the KN layer 3 are not matched with the crystal 10 of the substrate 1). However, according to the embodiment of the present invention, the KRN layer 2 is sandwiched between the substrate 1 and the KN layer 3. In addition to this, the mixing rate of rubidium (Rb) in the KRN layer 2 is 5 atom % at the surface on the side of the substrate 1, and then gradually decreases, and finally reaches 0 atom % at the surface on the side of the KN layer 3. Therefore, the mismatch of the lattice constants between the substrate 1 and the KN layer 3 is gradually eased in the direction from the substrate 1 to the KN layer 3, so that the influence of this mismatch on the KN layer 3 is reduced. Hence, the deformation in the KN layer 3 can be extremely reduced, as compared with the case where the KN layer 3 is directly grown on the substrate 1.

In addition, the mixing rate of rubidium (Rb) in the KRN layer 2 at the surface on the side of the substrate 1 (i.e., the maximum mixing rate of rubidium (Rb)) is not limited to 5 atom %. It will be appreciated that the mixing rate is within the range of 4 to 6 atom %. If it is within this range, a great number of the (002) planes may be included in the KN layer 3 laminated on the KRN layer 2.

Referring to FIGS. 5A through 5E, a fabricating process of the wavelength converting device of the embodiment of the present invention will be described. FIGS. 5A through 5E are sectional views showing the processes of fabricating the wavelength converting device.

Figure 5A:
FIGS. 5A through 5E show processes of fabricating the wavelength converting device of the embodiment of the present invention.
Figure 5B:
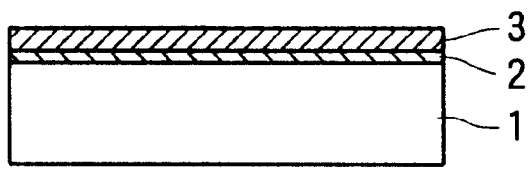

As show in FIG. 5A, the substrate 1 having a $MgO.AL_2O_3$(110) plane is prepared. Next, KRN layer 2 and the KN layer 3, as shown in FIG. 5B, are formed on the $MgO.AL_2O_3$(110) plane of the substrate 1 by using vapor phase epitaxy.

The KRN layer 2 is formed by using an oxide CVD apparatus under the following conditions. The temperature is approximately 850° C., and the pressure is approximately 5 Torr (reactor pressure). Potassium dipivaloylmethanate (or potassium 2,2,6,6-tetramethyl-3,5-heptnedionate: $K(C_{11}, H_{19}O_2)$); pentaethoxyniobium $Nb(OC_2H_5)_5$; and pentaethoxyrubidium $Rb(OC_2H_5)_5$ are used as material gas. In addition, $K(C_{11}H_{19}O_2)$ is referred to as "K(DPM)".

The KN layer 3 is formed by using an oxide CVD apparatus under the following conditions. The temperature is 850° C., The pressure is 5 Torr (reactor pressure). K(DPM) and pentaethoxyniobium $Nb(OC_2H_5)_5$ are used as material gas.

The processes of forming the KRN layer 2 and the KN layer 3 will be described in detail. Firstly, the substrate 1 having $MgO.AL_2O_3$(110) plane is set in the reaction chamber of the oxide CVD apparatus. Next, the temperature of the substrate 1 is increased to the predetermined temperature, about 850° C., and the pressure in the reaction chamber is decreased to the predetermined pressure, about 5 Torr. Next, the aforementioned primary materials are supplied to the carburetor of the oxide CVD apparatus. Next, these materials are sublimated or vaporized by maintaining the predetermined temperature, thereby producing organometallic gas. Next, this organometallic gas is sent as laminar flow to the reaction chamber in which the heated substrate 1 is set, by using Ar carrier gas and oxide gas $O_2$ whose flow rates are controlled. As a result, epitaxial layers are deposited on the substrate 1.

In these processes, while the KRN layer 2 is deposited, the quantity of flow of pentaethoxyrubidium $Rb(OC_2H_5)_5$ is gradually decreased from when the deposition of the KRN layer 2 is started until when the deposition of the KRN layer 2 is ended, in such a way that the quantity of flow of the pentaethoxyrubidium $Rb(OC_2H_5)_5$ becomes zero when the deposition of the KRN layer 2 has been just ended. As a result, the mixing rate of the rubidium (Rb) in the KRN layer 2 is continuously and monotonously decreased in the direction from the substrate 1 to the KN layer 3.

In addition, the oxide materials are created from the primary materials by oxide reactions. Therefore, it is preferable that a certain amount of oxygen is added to the reaction gas.

Furthermore, in addition to the K(DPM), alkoxide of each metal may be used as the primary material.

Moreover, Rb(DPM) similar to the K(DPM) may be used as a Rb material.

Figure 5C:
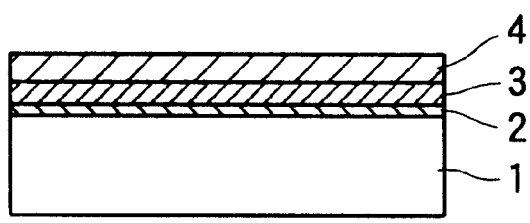

After forming the KRN layer 2 and the KN layer 3, a $TiO_2$ layer 4 is formed on the KN layer 3 by a sputtering method or vacuum deposition method, as shown in FIG. 5C.

The $TiO_2$ layer 4 is a dielectric layer having a higher refractive index than that of air in order to form a three dimensions waveguide. To meet a cutoff requirement to shut the laser light into the KN layer 3, the $TiO_2$ layer 4 is, for example, about 800 angstrom in thickness (in the case where the KN layer 3 is used as a single mode waveguide). If the thickness of the $TiO_2$ layer 4 is thick, the laser light is propagated though the $TiO_2$ layer 4 because the $TiO_2$ layer 4 has the higher refractive index than that of the KN layer 3. From this point of view, the thickness of the $TiO_2$ layer 4 is set so as to shut the laser light into the KN layer 3.

In addition, instead of the $TiO_2$ layer 4, a $SiO_2$ layer may be used as a layer to shut the light into the KN layer 3. However, in this case, it is needed to set the thickness of the $SiO_2$ layer 4 at about 2 to 3 $\mu$m for the above-mentioned reason.

Figure 5D:
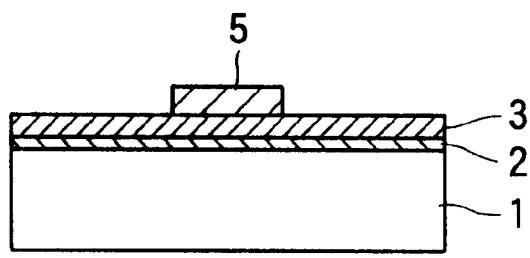

After forming the $TiO_2$ layer 4, a patterning process is treated with the $TiO_2$ layer 4, thereby forming a shutting layer 5, as shown in FIG. 5D. The shutting layer 5 is in the form of stripe extending along the transmitting direction of the laser light and having 4 $\mu$m width. In the patterning process, a photolithography technique, for example, an RIE (Reactive Ion Etching) method is used.

Figure 5E:
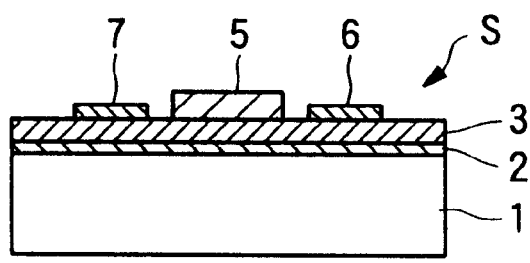

Next, as shown in FIG. 5E, a couple of electrodes 6 and 7 are formed on the area in the surface of the KN layer 3 where the $TiO_2$ layer 4 is removed. Each of the electrodes 6 and 7 is in the form of stripe and positioned parallel to the shutting layer 5. The electrodes 6 and 7 are devices to carried out the phase matching between the fundamental wave of the laser light and its second order harmonic. Aluminium, aluminium alloy, gold, or platinum may be used as a material of the electrodes 6 and 7. In consideration of applying a high electric field to the electrodes 6 and 7 when the wavelength converting device is actually driven, it is preferable to use gold or platinum as the material of the electrodes 6 and 7. In such processes, the wavelength converting device S is fabricated.

In addition to these processes, a diffraction grating 8 (FIG. 6) intended for a control of the incident light may be formed on the surface of the shutting layer 5.

Furthermore, the above-mentioned wavelength converting device adopts a loading type waveguide which uses $TiO_2$ or $SiO_2$ to shut the light beam. Alternatively, the KN layer may be directly formed in the form of stripe by a RIE method.

Figure 6:
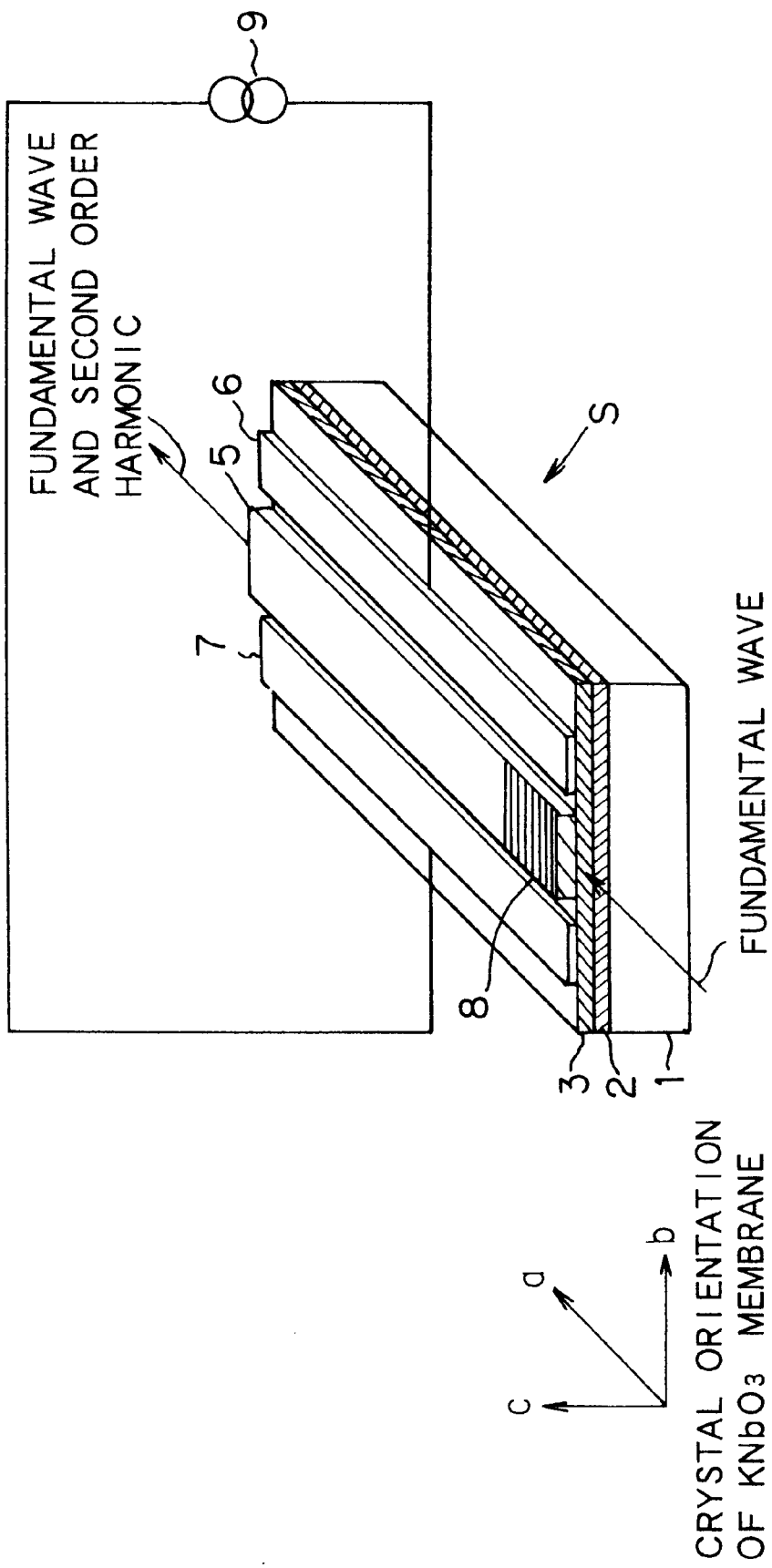
FIG. 6 shows the wavelength converting device of the embodiment of the present invention.

Referring to FIG. 6, an operation of the wavelength converting device S will be described. When the wavelength converting device S is operated, voltages are applied to the respective electrodes 6 and 7 from a power source 9 to apply an electric field between the electrodes 6 and 7. Next, the first order electric optical effect is obtained by the applied electric field, and the execution refractive index of the fundamental wave and the execution refractive index of the second order harmonic are controlled so as to match between both waves. Thus, the second order harmonic is obtained. The fundamental wave is entered at one end of the shutting layer 5, and the second order harmonic and the fundamental wave leave at the other end.

The wavelength converting experiment on the wavelength converting device S having the KN layer 3 with the thickness of 9000 angstrom, the KRN layer 2 with the thickness of 500 angstrom, the shutting layer 5 with the thickness of 800 angstrom, and the diffraction grating 8 which is located at the vicinity of the entrance of the fundamental wave, is done in a room temperature. In this experiment, the fundamental wave with the wavelength of 860 nm is entered. As a result, the good light shutting effect is obtained, and the second order harmonic is obtained in high conversion efficiency.

Furthermore, the stable output at the high level is obtained because of the high light damage resistance of the KN layer 3.

As can be understood from the above, the wavelength converting device S of the embodiment of the present invention has the KRN layer 2 between the substrate 1 and the KN layer 3. Therefore, the influence of the mismatch of the lattice constants between the substrate 1 and the KN layer 3 on the KN layer 3 can be eased, so that the deformation in the KN layer 3 can be reduced. Accordingly, high efficient wavelength conversion can be achieved.

Furthermore, as described above, the mixing rate X of rubidium Rb in the KRN layer 2 is 5 atom % at the surface on the side of the substrate 1, and is 0 atom % at the surface on the side of the KN layer 3. Therefore, the influence of the mismatch of the lattice constants between the substrate 1 and the KN layer 3 on the KN layer 3 can be sufficiently eased.

Moreover, as described above, the mixing rate X of rubidium Rb in the KRN layer 2 is gradually decreased between the surface on the side of the substrate 1 and the opposite surface. Therefore, the influence of the mismatch of the lattice constants between the substrate 1 and the KN layer 3 on the KN layer 3 can be much sufficiently eased.

Moreover, since the KN layer 3 has the (002) plane in the $KNbO_3$ crystal as its main surface, the wavelength conversion using a large nonlinear optical constant of the $KNbO_3$ crystal can be achieved.

Moreover, the KRN layer 2 is thin, namely, 500 angstrom in thickness.

The present invention is not limited to the above-described wavelength converting device. Some modifications are possible. For example, instead of the KRN layer 2, $K_{(1-x)}Cs_xNbO_3$ layer may be used. In this case, the mixing rate of cesium (Cs) is gradually decreased from the side of the substrate 1 to the side of the KN layer 3. As the cesium is larger than rubidium in diameter of ion, the influence of the mismatch of the lattice constants between the substrate 1 and the KN layer 3 on the KN layer 3 can be sufficiently eased.

Furthermore, instead of the KN layer 3, $LiNbO_3$ layer may be used as the waveguide. In this case, instead of the KRN layer 2, $LiRbNbO_3$ layer or $LiCsNbO_3$ layer is used as a buffer layer. Alternatively, $TaNbO_3$ is also used as a waveguide instead of the KN layer 3. In this case, TaRb-$NbO_3$ layer or $TaCsNbO_3$ is used as a buffer layer instead of the KRN layer 2.

Moreover, in the above-described wavelength converting device, the thickness of the KRN layer 2 is 500 angstrom.

This is not limited. For the purpose of minimizing the size of the device, it is preferable that this thickness is thin. However, for the purpose of the reduction of the deformation in the KN layer 3, it is preferable that this thickness is within the range of 300 to 500 angstrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-72793 filed on Mar. 20, 1998 including the specification, claims, drawings and summary is incorporated herein by reference in its entirety.

What is claimed is:

1. A wavelength converting device for converting a wavelength of a light, comprising:
   a waveguide layer for guiding the light;
   a substrate having a lattice constant different from a lattice constant of the waveguide layer; and
   a buffer layer disposed between the waveguide layer and the substrate and having a lattice constant between the lattice constant of the waveguide layer and the lattice constant of the substrate,
   wherein the waveguide layer comprises $KNbO_3$, the substrate comprises spinel, and the buffer layer comprises $K_{(1-x)}Rb_xNbO_3$.

2. A wavelength converting device for converting a wavelength of a light comprising:
   a waveguide layer for guiding the light;
   a substrate having a lattice constant different from a lattice constant of the waveguide layer; and
   a buffer layer which is disposed between the waveguide layer and the substrate and which has a lattice constant between the lattice constant of the waveguide layer and the lattice constant of the substrate,
   wherein the waveguide layer comprises $KNbO_3$, the substrate comprises spinel, the buffer layer comprises $K_{(1-x)}Rb_xNbO_3$, and a mixing rate of Rb in the $K_{(1-x)}Rb_xNbO_3$ in the buffer layer is in a range of 4 atom % to 6 atom % at a surface of the buffer layer touching the substrate, and is 0 atom % at a surface of the buffer layer touching the waveguide layer.

3. A wavelength converting device for converting a wavelength of a light comprising:
   a waveguide layer for guiding the light;
   a substrate having a lattice constant different from a lattice constant of the waveguide layer; and
   a buffer layer which is disposed between the waveguide layer and the substrate and which has a lattice constant between the lattice constant of the waveguide layer and the lattice constant of the substrate,
   wherein the waveguide layer comprises $KNbO_3$, the substrate comprises spinel, the buffer layer comprises $K_{(1-x)}Rb_xNbO_3$, and a mixing rate of Rb in the $K_{(1-x)}Rb_xNbO_3$ in the buffer layer is gradually varied between a surface of the buffer layer touching the substrate and a surface of the buffer layer touching the waveguide layer.

4. A wavelength converting device for converting a wavelength of a light comprising:
   a waveguide layer for guiding the light;
   a substrate having a lattice constant different from a lattice constant of the waveguide layer; and
   a buffer layer which is disposed between the waveguide layer and the substrate and which has a lattice constant between the lattice constant of the waveguide layer and the lattice constant of the substrate,
   wherein the waveguide layer comprises $KNbO_3$, the substrate comprises spinel, the buffer layer comprises $K_{(1-x)}Rb_xNbO_3$, and the waveguide layer has a surface including a (002) plane in $KNbO_3$ crystal.

5. A wavelength converting device for converting a wavelength of a light comprising:
   a waveguide layer for guiding the light;
   a substrate having a lattice constant different from a lattice constant of the waveguide layer; and
   a buffer layer which is disposed between the waveguide layer and the substrate and which has a lattice constant between the lattice constant of the waveguide layer and the lattice constant of the substrate,
   wherein the waveguide layer comprises $KNbO_3$ the substrate comprises spinel, the buffer layer comprises $K_{(1-x)}Rb_xNbO_3$, and the buffer layer is in a range of 300 angstrom to 500 angstrom in thickness.

6. A wavelength converting device for converting a wavelength of a light comprising:
   a waveguide layer for guiding the light;
   a substrate having a lattice constant different from a lattice constant of the waveguide layer; and
   a buffer layer which is disposed between the waveguide layer and the substrate and which has a lattice constant between the lattice constant of the waveguide layer and the lattice constant of the substrate,
   wherein the waveguide layer comprises $KNbO_3$, the substrate comprises spinel, the buffer layer comprises $K_{(1-x)}Cs_xNbO_3$.

7. A wavelength converting device for converting a wavelength of a light comprising:
   a waveguide layer for guiding the light,
   a substrate having a lattice constant different from a lattice constant of the waveguide layer; and
   a buffer layer which is disposed between the waveguide layer and the substrate and which has a lattice constant between the lattice constant of the waveguide layer and the lattice constant of the substrate,
   wherein the waveguide layer comprises $LiNbO_3$, the substrate comprises spinel, the buffer layer comprises one of $LiRbNbO_3$ and $LiCsNbO_3$.

8. A wavelength converting device for converting a wavelength of a light comprising:
   a waveguide layer for guiding the light;
   a substrate having a lattice constant different from a lattice constant of the waveguide layer; and
   a buffer layer which is disposed between the waveguide layer and the substrate and which has a lattice constant between the lattice constant of the waveguide layer and the lattice constant of the substrate,
   wherein the waveguide layer comprises $TaNbO_3$, the substrate comprises spinel, the buffer layer comprises one of $TaRbNbO_3$ and $TaCsNbO_3$.

9. A method of fabricating a wavelength converting device for converting a wavelength of a light, the wavelength converting device including a waveguide layer for guiding the light, a substrate having a lattice constant different from a lattice constant of the waveguide layer, and a buffer layer disposed between the waveguide layer and the substrate and having a lattice constant between the lattice constant of the waveguide layer and the lattice constant of the substrate, the method comprising the steps of:
preparing the substrate;
forming the buffer layer on the substrate by inducing crystal growth; and
forming the waveguide layer on the formed buffer layer by inducing crystal growth,
wherein the substrate comprising spinel is prepared in the process of preparing the substrate, the buffer layer comprising $K(1-x)Rb_xNbO_3$ is formed in the process of forming the buffer layer, and the waveguide layer comprising $KNbO_3$ is formed in the process of forming the waveguide layer.

10. A method of fabricating a wavelength converting device for converting a wavelength of a light, the wavelength converting device including a waveguide layer for guiding the light, a substrate having a lattice constant different from a lattice constant of the waveguide layer, and a buffer layer disposed between the waveguide layer and the substrate and with a lattice constant between the lattice constant of the waveguide layer and the lattice constant of the substrate, the method comprising the steps of:
preparing the substrate;
forming the buffer layer on the substrate by inducing crystal growth; and
forming the waveguide layer on the formed buffer layer by inducing crystal growth,
wherein the substrate comprising spinel is prepared in the process of preparing the substrate, the buffer layer comprising $K_{(1-x)}Rb_xNbO_3$ is formed in the process of forming the buffer layer, the waveguide layer comprising $KNbO_3$ is formed in the process of forming the waveguide layer, and the buffer layer whose mixing rate of Rb is in a range of 4 atom % to 6 atom % at a surface of the buffer layer on a side of the substrate and is 0 atom % at a surface of the buffer layer on a side of the waveguide layer is formed in the process of forming the buffer layer.

11. A method of fabricating a wavelength converting device for converting a wavelength of a light, the wavelength converting device including a waveguide layer for guiding the light, a substrate having a lattice constant different from a lattice constant of the waveguide layer, and a buffer layer which is disposed between the waveguide layer and the substrate and which has a lattice constant between the lattice constant of the waveguide layer and the lattice constant of the substrate, the method comprising the steps of:
preparing the substrate;
forming the buffer layer on the substrate by inducing crystal growth; and
forming the waveguide layer on the formed buffer layer by inducing crystal growth,
wherein the substrate comprising spinel is prepared in the process of preparing the substrate, the buffer layer comprising $K_{(1-x)}Rb_xNbO_3$ is formed in the process of forming the buffer layer, the waveguide layer comprising $KNbO_3$ is formed in the process of forming the waveguide layer, and the buffer layer whose mixing rate of Rb is gradually varied between a surface of the buffer layer on a side of the substrate and a surface of the buffer layer on a side of the waveguide layer is formed in the process of forming the buffer layer.

12. A method of fabricating a wavelength converting device for converting a wavelength of a light, the wavelength converting device including a waveguide layer for guiding the light, a substrate having a lattice constant different from a lattice constant of the waveguide layer, and a buffer layer which is disposed between the waveguide layer and the substrate and with a lattice constant between the lattice constant of the waveguide layer and the lattice constant of the substrate, the method comprising the steps of:
preparing the substrate;
forming the buffer layer on the substrate by inducing crystal growth; and
forming the waveguide layer on the formed buffer layer by inducing crystal growth,
wherein the substrate comprising spinel is prepared in the process of preparing the substrate, the buffer layer comprising $K_{(1-x)}Rb_xNbO_3$ is formed in the process of forming the buffer layer, and the waveguide layer comprising $KNbO_3$ is formed in the process of forming the waveguide layer and having a surface including a (002) plane in $KNbO_3$ crystal is grown in the process of forming the waveguide layer.

13. A method of fabricating a wavelength converting device for converting a wavelength of a light, the wavelength converting device including a waveguide layer for guiding the light, a substrate having a lattice constant different from a lattice constant of the waveguide layer, and a buffer layer disposed between the waveguide layer and the substrate and which buffer layer has a lattice constant between the lattice constant of the waveguide layer and the lattice constant of the substrate, the method comprising the steps of:
preparing the substrate;
forming the buffer layer on the substrate by inducing crystal growth; and
forming the waveguide layer on the formed buffer layer by inducing crystal growth,
wherein the substrate comprising spinel is prepared in the process of preparing the substrate, the buffer layer comprising $K_{(1-x)}Rb_xNbO_3$ is formed in the process of forming the buffer layer, the waveguide layer comprising $KNbO_3$ is formed in the process of forming the waveguide layer, and the buffer layer whose thickness is in a range of 300 angstrom to 500 angstrom is formed in the process of forming the buffer layer.

14. A method of fabricating a wavelength converting device for converting a wavelength of a light, the wavelength converting device including a waveguide layer for guiding the light, a substrate having a lattice constant different from a lattice constant of the waveguide layer, and a buffer layer disposed between the waveguide layer and the substrate and with a lattice constant between the lattice constant of the waveguide layer and the lattice constant of the substrate, the method comprising the steps of:
preparing the substrate;
forming the buffer layer on the substrate by inducing crystal growth; and
forming the waveguide layer on the formed buffer layer by inducing crystal growth,
wherein the substrate comprising spinel is prepared in the process of preparing the substrate, the buffer layer comprising $K_{(1-x)}Cs_xNbO_3$ is formed in the process of forming the buffer layer, the waveguide layer comprising $KNbO_3$ is formed in the process of forming the waveguide layer.

15. A method of fabricating a wavelength converting device for converting a wavelength of a light, the wavelength converting device including a waveguide layer for guiding the light, a substrate having a lattice constant different from a lattice constant of the waveguide layer, and a buffer layer disposed between the waveguide layer and the substrate and with a lattice constant between the lattice constant of the waveguide layer and the lattice constant of the substrate, the method comprising the steps of:

preparing the substrate;

forming the buffer layer on the substrate by inducing crystal growth; and forming the waveguide layer on the formed buffer layer by inducing crystal growth, wherein the substrate comprising spinel is prepared in the process of preparing the substrate, the buffer layer comprising one of $LiRbNbO_3$ and $LiCsNbO_3$ is formed in the process of forming the buffer layer, the waveguide layer comprising $LiNbO_3$ is formed in the process of forming the waveguide layer.

16. A method of fabricating a wavelength converting device for converting a wavelength of a light, the wavelength converting device having a waveguide layer for guiding the light, a substrate having a lattice constant different from a lattice constant of the waveguide layer, and a buffer layer disposed between the waveguide layer and the substrate and with a lattice constant between the lattice constant of the waveguide layer and the lattice constant of the substrate, the method comprising the steps of:

preparing the substrate;

forming the buffer layer on the substrate by inducing crystal growth; and forming the waveguide layer on the formed buffer layer by inducing crystal growth, wherein the substrate comprising spinel is prepared in the process of preparing the substrate, the buffer layer comprising one of $TaRbNbO_3$ and $TaCsNbO_3$ is formed in the process of forming the buffer layer, the waveguide layer comprising $TaNb_{O3}$ is formed in the process of forming the waveguide layer.

* * * * *